US011641938B1

(12) United States Patent
Cotterill

(10) Patent No.: US 11,641,938 B1
(45) Date of Patent: May 9, 2023

(54) LID HOLDER

(71) Applicant: Dennis Cotterill, Markesan, WI (US)

(72) Inventor: Dennis Cotterill, Markesan, WI (US)

( * ) Notice: Subject to any disclaimer, the term of this patent is extended or adjusted under 35 U.S.C. 154(b) by 0 days.

(21) Appl. No.: 17/566,297

(22) Filed: Dec. 30, 2021

(51) Int. Cl.
*A47B 81/04* (2006.01)
*A47J 47/16* (2006.01)
*A47F 5/01* (2006.01)
*A47F 5/04* (2006.01)

(52) U.S. Cl.
CPC ............. *A47B 81/04* (2013.01); *A47F 5/01* (2013.01); *A47F 5/04* (2013.01); *A47J 47/16* (2013.01)

(58) Field of Classification Search
CPC ..... A47B 81/04; A47B 81/007; A47B 87/005; A47B 87/0207; A47F 5/01; A47F 5/04; A47J 47/16
See application file for complete search history.

(56) References Cited

U.S. PATENT DOCUMENTS

| D39,996 | S | * | 5/1909 | Michaelis | 211/85.17 |
| 1,228,083 | A | * | 5/1917 | Warfel | A47B 19/06 |
| | | | | | 248/447.2 |
| 1,269,837 | A | * | 6/1918 | Moffitt | A45D 20/02 |
| | | | | | 34/96 |
| 1,415,782 | A | * | 5/1922 | Brace | A47F 5/04 |
| | | | | | 108/150 |
| 2,237,914 | A | * | 4/1941 | Rader | A47B 19/002 |
| | | | | | 108/30 |
| 2,243,912 | A | * | 6/1941 | Legler | A47F 5/04 |
| | | | | | 248/160 |
| 2,286,831 | A | * | 6/1942 | Ressinger | A47F 5/01 |
| | | | | | D6/672 |
| 2,455,278 | A | * | 11/1948 | Stewart | A47F 5/04 |
| | | | | | 248/176.1 |
| 2,710,051 | A | * | 6/1955 | Greenberg | A47C 7/70 |
| | | | | | 297/170 |
| 3,141,557 | A | * | 7/1964 | Marschak | A47F 5/04 |
| | | | | | 211/205 |
| 3,392,955 | A | * | 7/1968 | Cole | G01G 19/44 |
| | | | | | 312/231 |
| 4,122,954 | A | * | 10/1978 | Slater | A47F 3/14 |
| | | | | | 211/133.4 |
| D280,065 | S | * | 8/1985 | Pierscinski | D7/409 |
| 4,821,985 | A | * | 4/1989 | DeMatteis | A47F 13/085 |
| | | | | | 211/12 |

(Continued)

FOREIGN PATENT DOCUMENTS

FR 2679748 A1 * 2/1993 ............. A47G 19/30

*Primary Examiner* — Devin K Barnett
(74) *Attorney, Agent, or Firm* — Boardman & Clark LLP

(57) ABSTRACT

An apparatus with a base and support elements to hold the lid of a cooking vessel. The apparatus has an upright support element attached to the base via a base element, and the upright support element is prevented from rotating in relation to the base element by nature of projections on the upright support element and corresponding indentations on the base element. Further, the apparatus has a horizontal cross member affixed to an upper end of the upright support element, and a holding element extends outwardly at an angle therefrom. The holding element has one or more projections which serve to affix the holding element to the horizontal support element, which itself has apertures and indentations that are complementary in geometry to the projections of the holding element.

10 Claims, 6 Drawing Sheets

(56) References Cited

U.S. PATENT DOCUMENTS

| | | | | |
|---|---|---|---|---|
| 4,919,298 | A * | 4/1990 | Gregory | B44D 3/14 220/759 |
| 5,127,529 | A * | 7/1992 | Martinez | A47G 25/00 211/37 |
| 5,144,898 | A * | 9/1992 | Posly | A47B 23/046 108/148 |
| D372,533 | S * | 8/1996 | Davis | 211/205 |
| 5,542,314 | A * | 8/1996 | Sullivan | B60R 11/0252 224/276 |
| 5,568,872 | A * | 10/1996 | Hinnant, Sr. | A47F 7/021 211/205 |
| 5,727,699 | A * | 3/1998 | Gilcrease | A47F 7/17 211/49.1 |
| D398,483 | S * | 9/1998 | Stocco | D7/601 |
| 6,104,017 | A * | 8/2000 | Kim | A47J 36/027 219/762 |
| 6,216,886 | B1 * | 4/2001 | Considine | A47F 5/06 248/219.2 |
| 6,386,491 | B1 * | 5/2002 | Bissett | F21S 4/10 248/176.1 |
| 6,483,026 | B1 * | 11/2002 | Snider, Jr. | H02G 3/32 174/496 |
| D468,163 | S * | 1/2003 | Blake | D7/601 |
| 6,516,959 | B1 * | 2/2003 | Gribbins | B25H 3/04 211/205 |
| D476,847 | S * | 7/2003 | Kingsley | D7/396.1 |
| 8,621,988 | B1 * | 1/2014 | O'Dea | A47J 43/18 99/347 |
| 9,161,619 | B1 * | 10/2015 | Somers | A47B 47/0091 |
| 10,085,572 | B2 * | 10/2018 | Simone | F16M 13/02 |
| 10,219,605 | B1 * | 3/2019 | Love | A47F 5/06 |
| D887,779 | S * | 6/2020 | Merritt | D7/409 |
| 2002/0027181 | A1 * | 3/2002 | Hatfield | A63B 55/57 248/150 |
| 2003/0213759 | A1 * | 11/2003 | Compagnucci | A47L 19/04 211/41.11 |
| 2004/0251222 | A1 * | 12/2004 | Ohanian | A47J 47/16 211/181.1 |
| 2006/0065613 | A1 * | 3/2006 | McKay | A47F 5/02 211/85.2 |
| 2006/0186124 | A1 * | 8/2006 | Sergianni | A47J 47/16 220/572 |
| 2008/0078731 | A1 * | 4/2008 | Shibel | A47F 7/00 211/205 |
| 2013/0284863 | A1 * | 10/2013 | Daniel | F16M 11/24 248/125.1 |
| 2014/0318085 | A1 * | 10/2014 | Sill | B65B 67/1266 211/49.1 |
| 2015/0014495 | A1 * | 1/2015 | Bausman | A47J 47/16 248/176.2 |
| 2016/0271999 | A1 * | 9/2016 | Beta | F16M 11/42 |
| 2017/0215604 | A1 * | 8/2017 | Simone | A47F 5/13 |
| 2019/0110637 | A1 * | 4/2019 | Groll | A47J 36/12 |
| 2020/0397196 | A1 * | 12/2020 | Nie | A47B 77/14 |

* cited by examiner

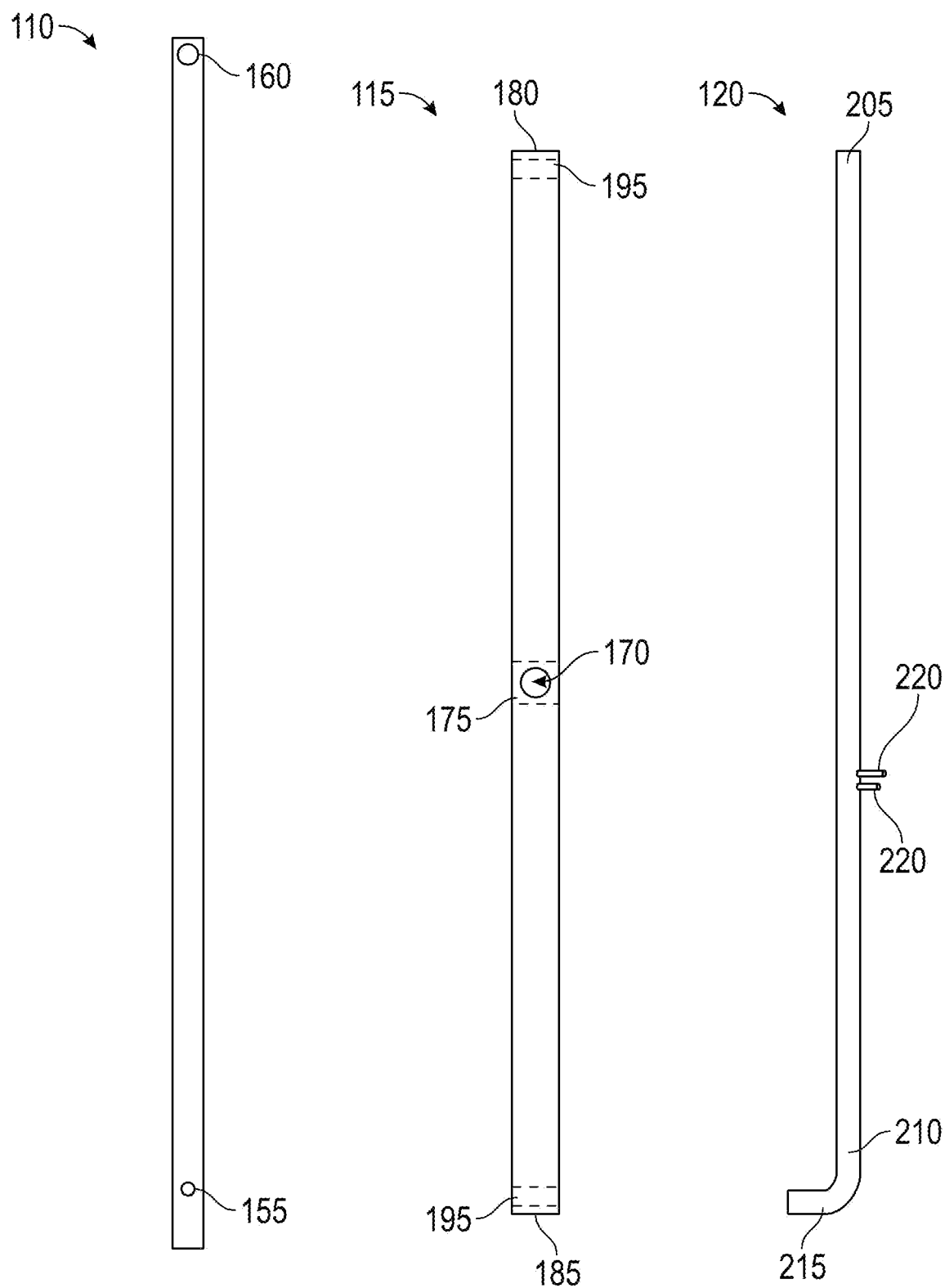

LID HOLDER

FIELD

This invention relates to lids of cooking vessels. More specifically, this invention relates to holders for lids of cooking vessels.

BACKGROUND

A cooking vessel, such as a pot, may have a lid that creates a seal around a diameter of the cooking vessel. A lid may be used for myriad purposes, such as retaining liquid and heat while in use, preventing introduction of foreign objects into the cooking vessel, and minimizing the risk of accidental spillage upon transportation. Given that cooking often involves the applying heat to the cooking vessel, which will itself often contain mixtures of both liquids and solids, the cooking process will necessarily produce steam. Without a lid attached to the cooking vessel, steam will naturally rise upwards from the cooking vessel. When a lid is attached to the cooking vessel, the egress of steam is reduced, leading to an accumulation of condensation on the interior surface of the lid. When the lid is removed by an individual during the cooking process or while serving a finished product, the lid must necessarily be relocated.

The lid may be placed on a counter or other such work surface, but the physical movement of removal and relocation may dislodge the accumulated condensation onto the work surface, resulting in possible staining or an additional mess to be cleaned up. Alternatively, the lid may be placed upside down on the same work surface to avoid dislodging the accumulated condensation. However, returning the lid to its original position on the cooking vessel may entail grabbing the lid by its external surface, which may be hot, and turning it in midair. This process may lead to the user dropping the lid or accidentally burning themselves. An additional problem may arise if a user intends to set up multiple cooking vessels in a single location.

Further, certain cooking vessels do not require placement on a stove or range in order to operate, such as a Crockpot™. It is common to place these types of cooking vessels on any suitable surface, such as a counter, during the cooking process. Because these cooking vessels are also fairly easy to transport, it is relatively common to see their use in communal dining settings such as pot-lucks, tailgates, cookouts. Given that the settings for these gatherings may be in locations not typically patronized by large numbers of individuals, or at locations lacking dedicated dining infrastructure, available space may be limited.

In settings with limited space and multiple cooking vessels, placing a lid on a work or serving surface may be infeasible. If there is no available space upon which to set a lid, a user may elect to continue holding onto the lid upon removal. However, this would necessarily limit the user to the use of a single hand. If the user attempted to perform a task preferably requiring the use of two hands while still holding the lid, the user would be at risk of either dropping the lid or accidentally burning themselves or someone in their immediate vicinity.

Therefore, what is needed is a facile, space-efficient solution for storing the lid of a cooking vessel in a manner that prevents dislodging accumulated condensation onto work surfaces and that allows for easy removal and replacement of the lid during cooking and serving activities.

SUMMARY

There is a need for a lid holder which allows for the facile storage of a lid without the need to place the lid on a work surface or the need to keep holding onto the lid.

There is also a need for a lid holder that may support a lid such that condensation on the lid can run and/or drip into the cooking vessel while the lid is on the lid holder.

Accordingly, one aspect of the present disclosure includes a lid holder that includes a base plate with one or more base plate insertion elements, upright support elements inserted into the base plate insertion elements, a cross member affixed to an upper portion of the upright support elements, and one or more holding members or rods further affixed to the cross member, which holding rods each further comprise a straight end and a hooked end.

Another aspect of the disclosure includes a lid holder that includes a base plate insertion element having indentations that correspond with the geometry of projections affixed to the bottom portion of the upright insertion element that prevent the upright support element from rotating upon insertion.

Another aspect of the disclosure includes a lid holder that includes a cross member having one or more cross member apertures and cross member indentations which are equivalent in number and geometry to holding elements present on one or more holding rods.

Accordingly, another aspect of the disclosure includes a lid holder comprising a base plate having an insertion element; an upright support element provided in the insertion element and extending upwards from the base plate; a cross member coupled to an upper portion of the upright support element, and a holding rod extending from the cross member, wherein the holding rod comprises a straight end, a hooked end with a hook, and a holding element.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 7 is an isolated view of the upright support element of the lid holder of FIG. 1, according to various examples of embodiments;

FIG. 8 is an isolated view of the cross member of the lid holder of FIG. 1, according to various examples of embodiments; and FIG. 9 is an isolated view of a holding rod of the lid holder of FIG. 1, according to various examples of embodiments.

Figure 1:
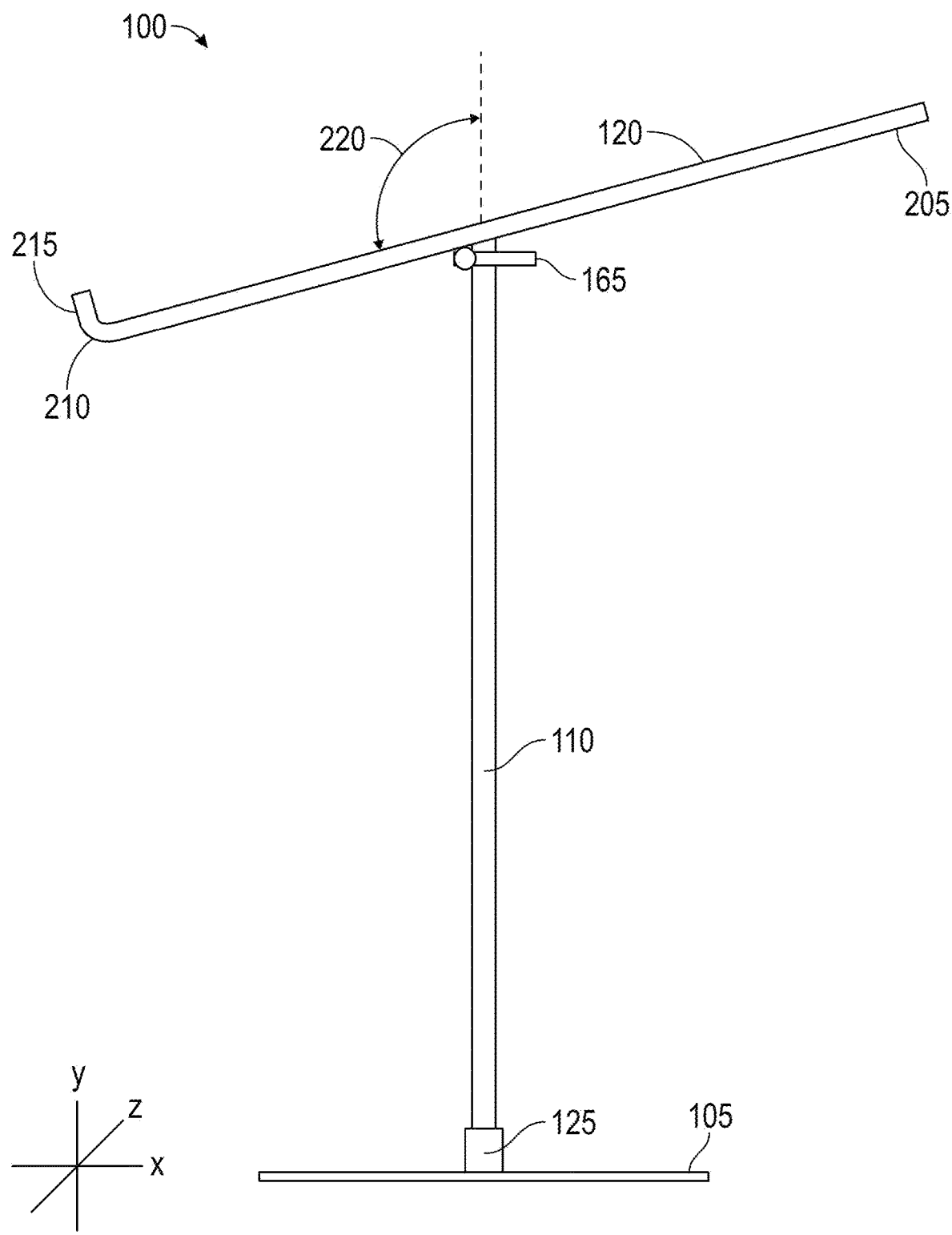
FIG. 1 is a perspective view of a lid holder, according to various examples of embodiments.
Figure 2:
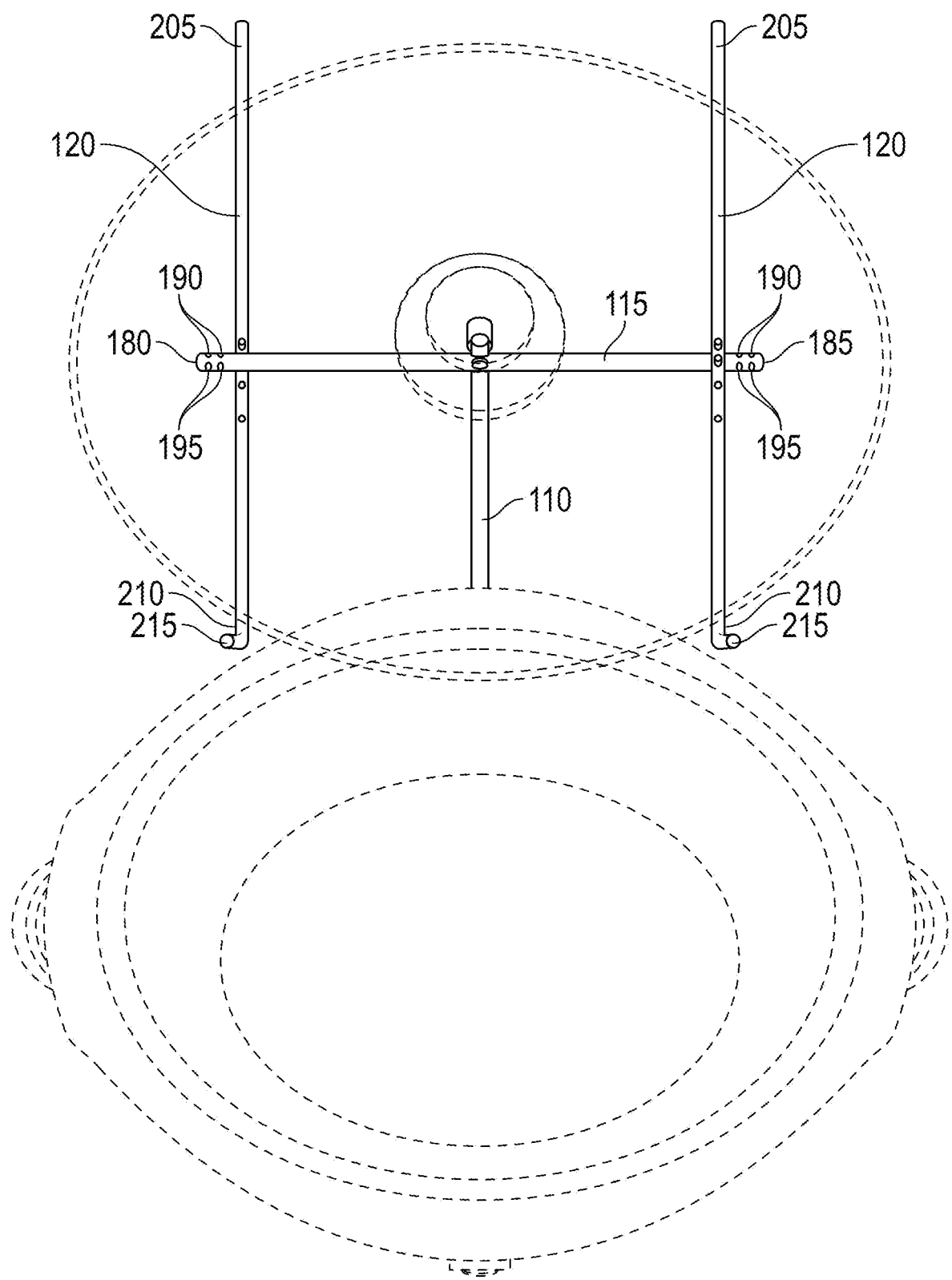
FIG. 2 is another perspective view of the lid holder of FIG. 1 while in use, according to various examples of embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

In various examples of embodiments, a lid holder 100 is shown. In various embodiments, lid holder 100 includes a base plate 105, an upright support element 110, a cross member support 115, and holding rods 120. The shown lid holder 100 is used for understanding the apparatus described herein.

In various embodiments, base plate 105 of lid holder 100 comprises a solid piece of material with an insertion element 125 located in the approximate center of base plate 105. Insertion element 125 may be integral with base plate 105 or attached separately by a process such as, but not limited to, welding. While base plate 105 is depicted as rectangular in form, one skilled in the art will appreciate that any number of shapes may be appropriate such as, but not limited to, circles, squares, crosses, or any combination thereof. Further, base plate 105 may define geometric cutouts (not shown) (e.g., to provide necessary support while minimizing the amount of material needed to produce base plate 105). While base plate 105 is depicted as a single piece of material, additional weight elements (not shown) may be affixed, either permanently or on an as-needed basis, to base plate 105 to increase its total mass and to resist movement (e.g., while lid holder 100 is in use).

In various examples of embodiments, insertion element 125 may be cylindrical in nature, having both an internal diameter 130 and an external diameter 135. In various embodiments, internal diameter 130 has dimensions similar to a diameter of upright support member 110 so as to create a tight, press, or friction fit between insertion element 125 and upright support member 110. In various embodiments, in order to receive the upright support member 110, the insertion element 125 further defines a cavity 140 with a circumference corresponding to internal diameter 130. The length of cavity 140 may extend fully into insertion element 125 so as to be equivalent or substantially similar in length to a height 145 of the insertion element 125, or it may take a different length depending on specific user needs. In various examples of embodiments, insertion element 125 may also have one or more indentations 150 on an upper portion of insertion element 125 that are each configured to receive a corresponding projection 155 of upright support element 110. While insertion element 125 is depicted as having indentations 150 of a semi-circular geometry, one skilled in the art will appreciate that any number of different geometries may be possible and are anticipated. Further, while two indentations 150 are shown, one skilled in the art will appreciate that any number of indentations 150 and corresponding projections 155 may be provided, and that upright support element 110 may be coupled to base element 125 without the use of indentations 150 or projections 155.

While, in various examples of embodiments, the insertion element 125 is depicted as a cylinder, one skilled in the art will appreciate that any number of different geometries of both internal diameter 130 or other dimension and external diameter 135 or other dimension may be utilized based on specific user needs or as desired. Further, while only one insertion element 125 is depicted, one skilled in the art will appreciate that a plurality of insertion elements 125 may be provided to support a plurality of upright support elements 110 that may accommodate lids of varied sizes and geometries. One skilled in the art will further appreciate that attaching upright support element 110 to insertion element 125 may be accomplished through any number of means, including, but not limited to, snap fitting, friction fitting, welding, or having upright support element 110 receive insertion element 125.

Figure 3:
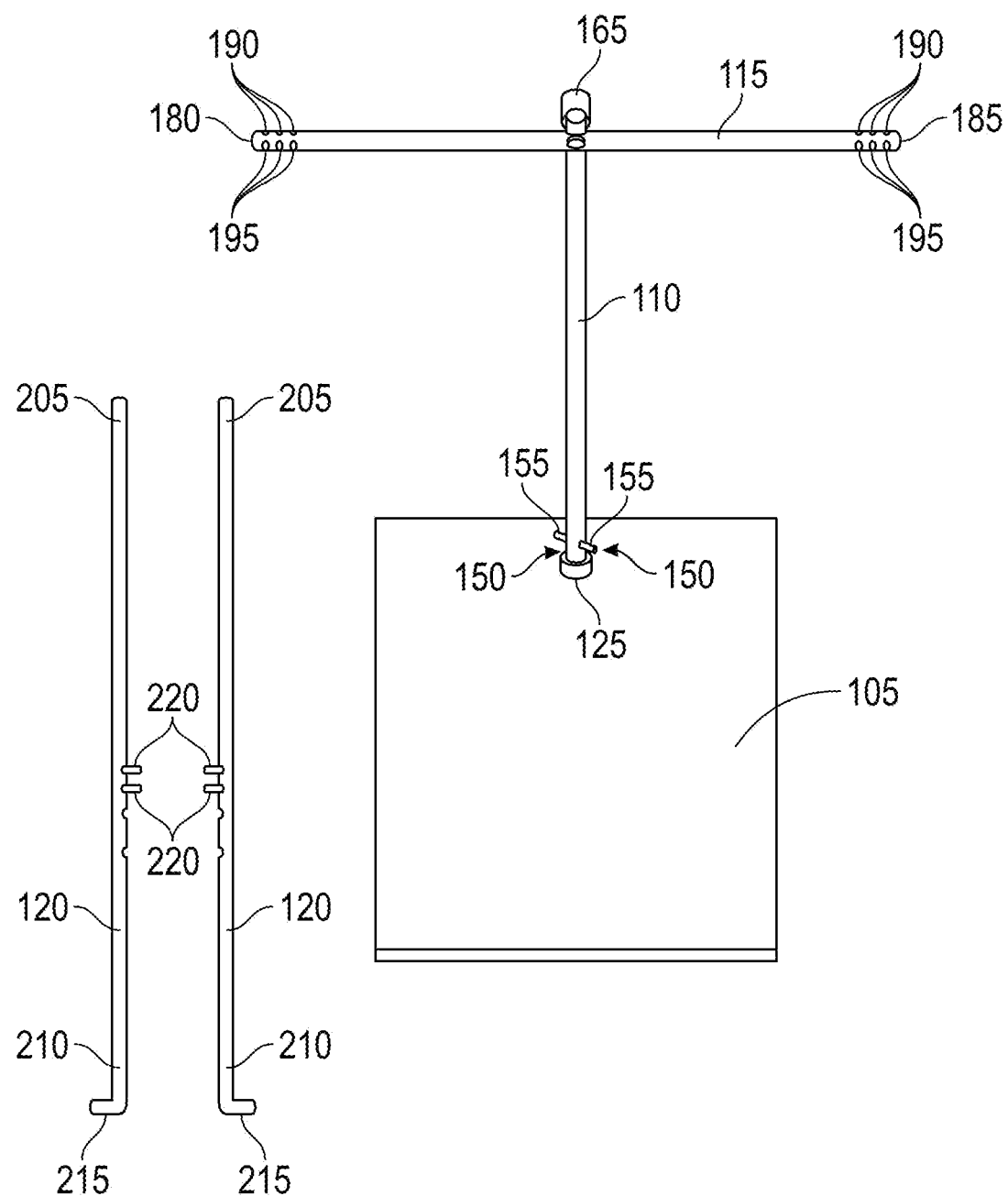
FIG. 3 is another perspective view of the lid holder of FIG. 1 with the holding rods removed, according to various examples of embodiments.
Figure 4:
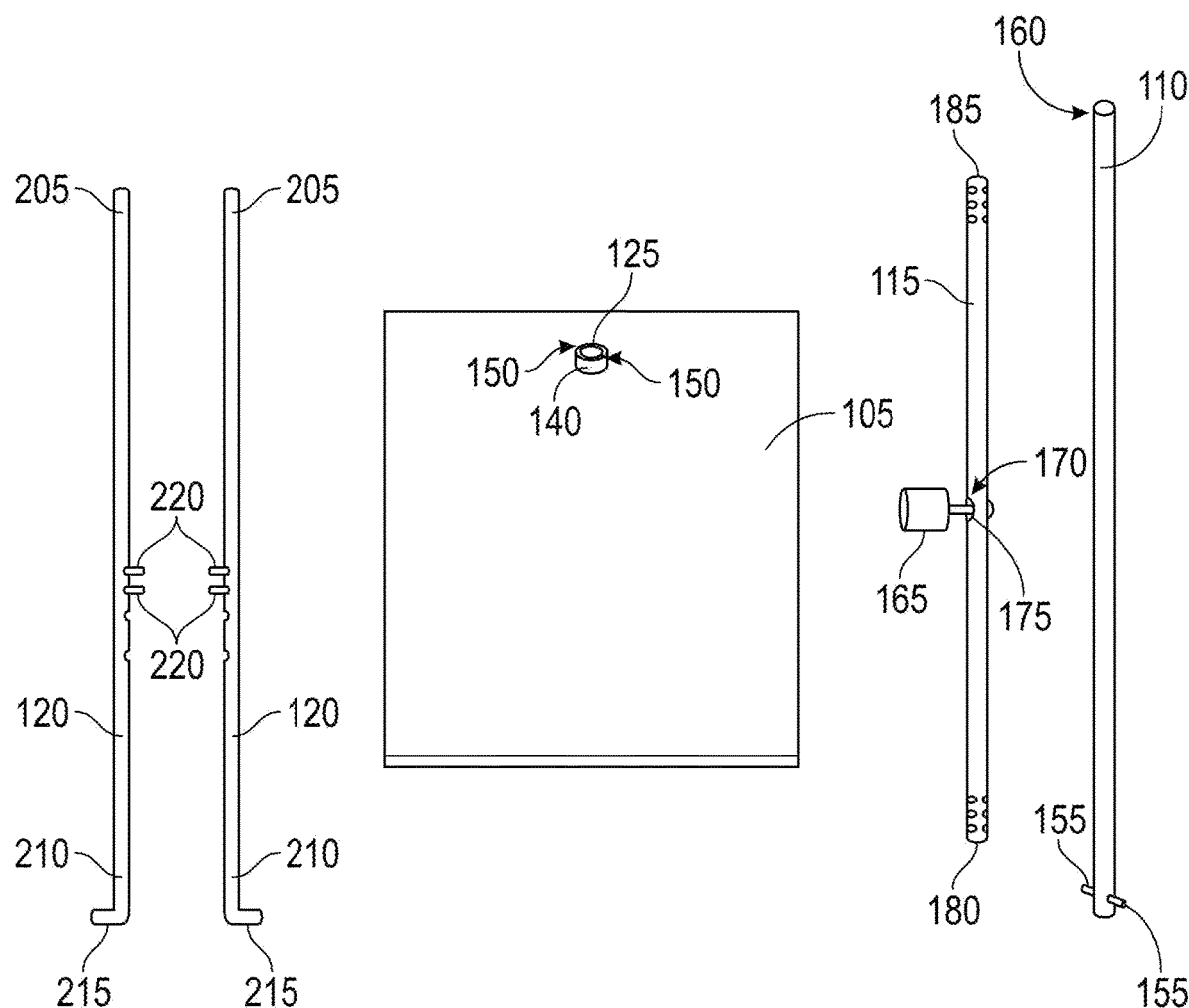
FIG. 4 is an exploded view of the lid holder of FIG. 1, according to various examples of embodiments.
Figure 5:
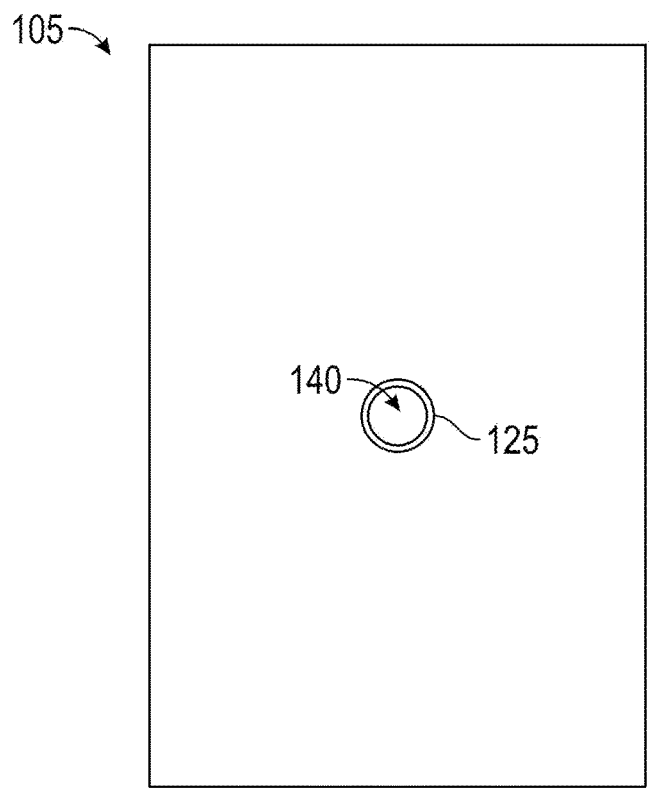
FIG. 5 is an isolated view of the base plate of the lid holder of FIG. 1, according to various examples of embodiments.
Figure 6:
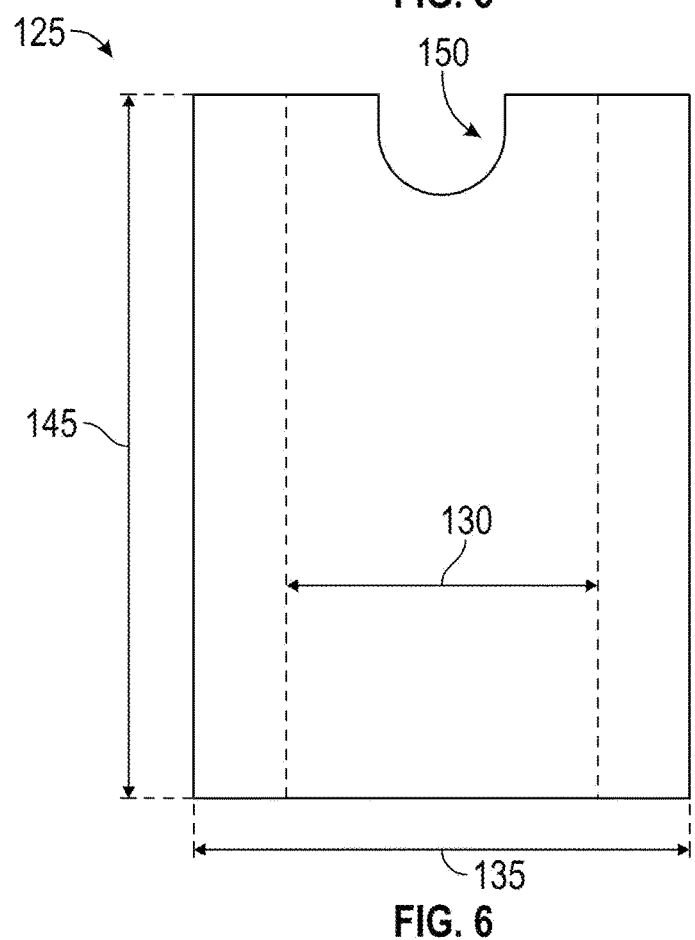
FIG. 6 is an isolated view of the base plate insertion element of the lid holder of FIG. 1, according to various examples of embodiments.

In various examples of embodiments, upright support element 110 extends vertically in the Y axis. Upright support element 110 as depicted takes the form of a circular rod, but the upright support element may have other geometries, such as a square cross-section. Upright support element 110 may have one or more projections 155 on its lower portion which may be integral with the upright support element 110, and which extend outward in a direction perpendicular to the longitudinal axis of upright support element 110. The geometry of projection 155 is designed to permit projection 155 to fit within indentation 150 of insertion element 125 so as to prevent rotation of upright support element 110 relative to insertion element 110 while upright support element 110 is inserted into or otherwise coupled to insertion element 125. For example, projections 155 in FIG. 3 are circular in cross-sections and match or correspond to the semi-circular geometry of indentations 150.

In various example embodiments, the upper portion of upright support element 110 defines an upright support element through-hole 160. Upright support element through-hole 160 may be of a certain diameter or other dimension and may be threaded in order to accommodate a screw or fastener 165 which may serve to attach upright support element 110 to cross member 115.

In various example embodiments, cross member 115 extends in in a direction perpendicular to upright support element 110. Cross member 115 defines a cross member through-hole 170 of substantially the same dimensions as upright support element through-hole 160 so that when cross member through-hole 170 and upright support member through-hole 160 are aligned with each other, a screw 165 may be inserted, thus joining or coupling upright support member 110 and cross member 115 to each other.

To facilitate the attachment or coupling of upright support member 110 and cross member 115, a depression 175 surrounding cross member through-hole 170 may be provided, and depression 175 may have a geometry complementary to the external geometry of upright support element 110. By means of an example, upright support element 110 may be of a generally cylindrical geometry and depression 175 may have a complementary geometry so as to partially enclose a portion of upright support element 110 in contact with cross member 115. While a screw mechanism is depicted, other appropriate methods of attaching or coupling upright support element 110 and cross member 115 are considered, including, but not limited to, friction fitting, welding, and snap fitting. Further, the upright insertion element and the cross member may be integral with each other and may not require any additional attachment.

Further, in various examples of embodiments, on each of a first terminal end 180 and second terminal end 185 of cross member 115 there exists one or more cross member apertures 190 and one or more cross member indentations 195.

One or more cross member apertures 190 may extend fully through cross member 115 as depicted or may extend only partially into the cross member. The cross member indentations may take any number of shapes, but cross member indentations 195 depicted take the form of a semi-circle. In various embodiments, cross member apertures 190 and cross member indentations 195 are substantially parallel with one another so as to exist or be provided in the same plane and extend in the same direction as each other. That is to say, in various embodiments, each cross member aperture 190 has one or more corresponding cross member indentations 195.

In various examples of embodiments, each cross member indentation 195 and cross member aperture 180 may extend at an angle 200 ranging from 0 degrees and 90 degrees relative to a vertical Y axis. In other words, the direction of cross member apertures 190 may be defined by angle 200 and the direction of corresponding cross member indentations 195 may be defined by same angle 200. While each depicted cross member aperture 190 has a corresponding cross member indentation 195, it should be appreciated that multiple cross member indentations 195 may be associated with each cross member aperture 190. Further, as depicted, in various embodiments, each of first terminal end 180 and second terminal end 185 have three cross member apertures 190 and corresponding cross member indentations 195 so as to provide options or alternatives as to where to insert holding rods 120 into cross member 115. While three cross member apertures 190 and three corresponding cross member indentations 195 are depicted, it should be appreciated that any number of cross member apertures 190 and corresponding cross member indentations 195 may be appropriate based on specific user needs or desires.

In various example embodiments, holding rod 120 has a straight end 205 and a bent or hooked end 210 with a hook 215. Hook 215 may have a height sufficient to prevent gravity from moving or sliding a lid of a cooking vessel relative to holding rod 120. That is to say that the height of the hook may vary to accommodate a variety of lids based on specific user needs. While hook 215 is depicted as being curved, any appropriate hook angle, orientation, or geometry is possible and anticipated.

In various examples of embodiments, holding rod 120 includes a plurality of holding elements 220 located a distance from straight end 205. In various embodiments, the geometries of holding elements 220 are configured so as to match or otherwise correspond with the geometries of the one or more cross member apertures 190 and one or more cross member indentations 195. That is to say, in various embodiments, the geometry of holding element 220 will substantially match or correspond with the geometry of cross member aperture 190 so as to allow or provide for the snug insertion of holding element 220 into cross member aperture 190. Further, any of holding elements 220 not inserted into a cross member aperture 190 will have a geometry matching or corresponding to a geometry of the one or more cross member indentations 195 so as to allow a holding element 220 to fit snugly into space defined by the one or more cross member indentations 195.

While two holding elements 220 are shown on each of holding rods 120, different numbers of holding elements 220 may be provided. By means of example, a cross member 115 with one cross member aperture 190 and one cross member indentation 195 is depicted as having two holding elements 220, and a cross member with one cross member aperture and two cross member indentations may include three holding elements. While holding rods 120 as depicted are affixed to cross member 115 by means of holding elements 220, the one or more holding rods may alternatively be integral with the cross member so as to constitute a single piece of contiguous material.

When lid holder 100 is fully assembled according to various examples of embodiments, one or more upright support elements 110 are at least partially supported by one or more insertion elements 125 which are themselves coupled or attached to base plate 105. In various embodiments, the upper portion of each of one or more upright support elements 110 is coupled or affixed to cross member 115, and cross member 115 further has holding rods 120 affixed thereto by means of holding elements 220. In various embodiments, hook 215 of each of the one or more holding rods 120 has a height, shape, and geometry sufficient to hold the lid of a cooking vessel.

It is anticipated that any number of coatings or treatments may be applied either to the entirety of lid holder 100 upon assembly or to each constituent part prior to assembly. Such coatings or treatments may include, but are not limited to, powder-coating, anodization, acid baths, or plastic coatings. Further, the materials used in the construction of each component part of lid holder 100 may be of any suitable material including, but not limited to, plastic, aluminum, steel, brass, or any mixtures thereof.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A lid holder comprising:
a base plate having an insertion element defined by an internal circumference, an external circumference, a height, and an internal cavity at least partially defined by the internal circumference, the internal cavity extending at least partially into the insertion element;
an upright support element coupled to the insertion element and extending upwards from the base plate;
a cross member coupled to an upper portion of the upright support element, wherein the cross member defines a one or more cross member apertures and a one or more cross member indentations on a first terminal end and a one or more cross member apertures and a one or more cross member indentations on a second terminal end opposite the first terminal end, each of the one or more cross member apertures extending at least partially into the cross member; and
a holding rod extending from the cross member, wherein the holding rod comprises a straight end, a hooked end with a hook, and a holding element, the holding element is configured to be inserted within one of the one or more cross member apertures of the first terminal end or the second terminal end or one of the one or more cross member indentations of the first terminal end or the second terminal end to affix the holding rod to the cross member.

2. The lid holder of claim 1, wherein the base plate has one or more weight elements coupled thereto.

3. The lid holder of claim 1, wherein the insertion element is further defined by one or more indentations on an upper end of the insertion element.

4. The lid holder of claim 3, wherein a lower portion of the upright support element has a number of projections equal to the number of indentations on an upper end of the insertion element, the number of projections corresponding with a geometry of the one or more indentations of the insertion element and extending outward in a direction perpendicular to a longitudinal axis of the upright support element so as to help allow the projection and the insertion element to couple with each other.

5. The lid holder of claim 1, wherein the upright support element defines an upright insertion through-hole with a diameter, and wherein the cross member defines a cross member through-hole of substantially the same diameter as the diameter of the upright insertion through-hole.

6. The lid holder of claim 5, wherein the cross member defines a depression surrounding the cross member through-hole, and wherein the depression has dimensions such as to promote a complementary fit between the cross member and the upright support element.

7. The lid holder of claim 1, wherein the upright support element and cross member are integral with each other and are formed from a single piece of material.

8. The lid holder of claim 1, wherein the one or more cross member apertures and the one or more cross member indentations on each of the first terminal end and second terminal end of the cross member extend in a parallel direction at an angle between 0 degrees and 90 degrees relative to a vertical Y axis.

9. The lid holder of claim 1, wherein the holding element of the holding rod has a geometry substantially equivalent to each cross member indentation and cross member aperture on one or more of either the first or second terminal end of the cross member.

10. The lid holder of claim 1, wherein the holding rod and the cross member are integral with one another and/or are made from a single piece of material.

* * * * *